Nov. 4, 1952     P. W. HOVEY ET AL     2,616,526
HYDRAULICALLY ACTUATED DISK TYPE AUTOMOTIVE VEHICLE BRAKE
Filed April 24, 1950     2 SHEETS—SHEET 1

Inventors
Preston W. Hovey
Charles G. King
By Philip A. Friedell
Attorney

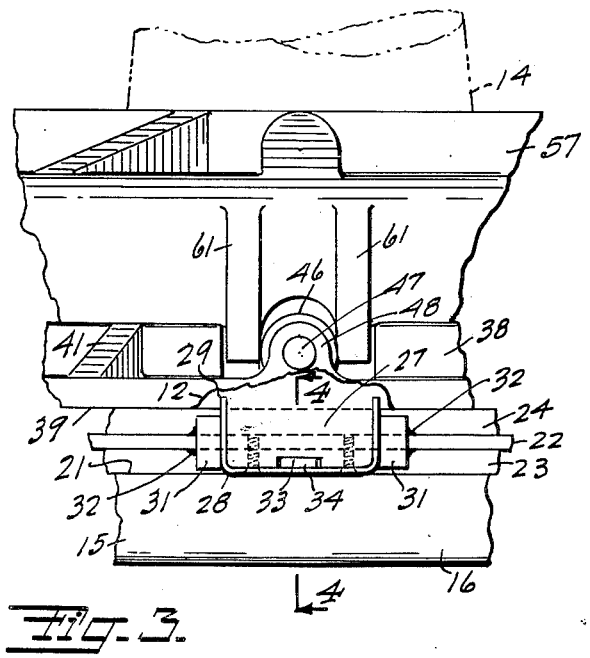
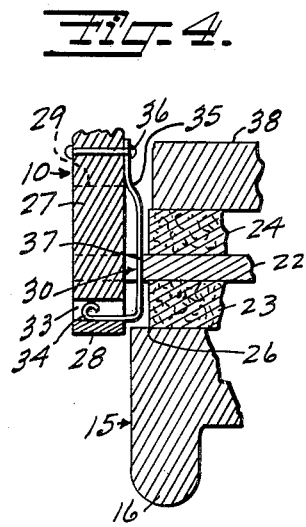
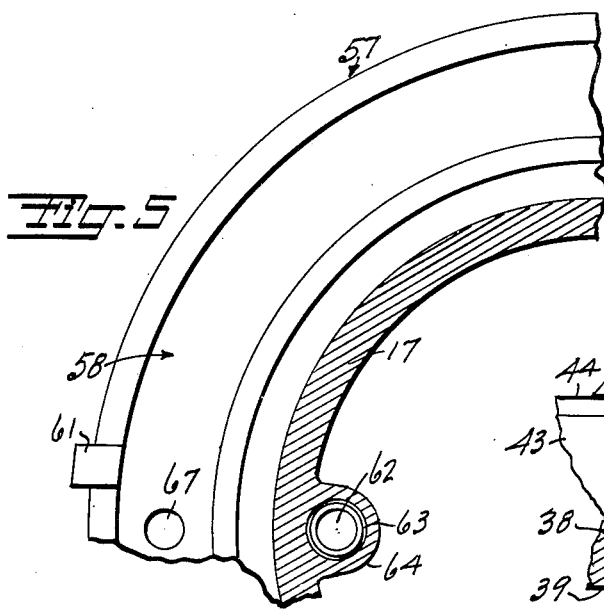
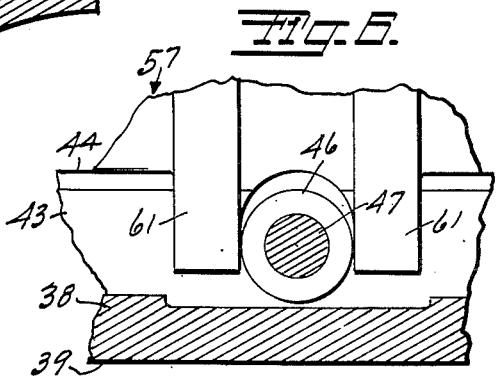

Patented Nov. 4, 1952

2,616,526

UNITED STATES PATENT OFFICE 2,616,526

HYDRAULICALLY ACTUATED DISK TYPE AUTOMOTIVE VEHICLE BRAKE

Preston W. Hovey, Berkeley, Calif., and
Charles G. King, Portland, Oreg.

Application April 24, 1950, Serial No. 157,726

4 Claims. (Cl. 188—152)

This invention relates to improvements in automotive vehicle brakes and particularly to brakes for heavy vehicles such as trucks and truck trailers, and provides a new and very efficient brake in the form of a disc type brake which is actuated through the medium of a fluid under pressure. It also provides a very simple combination of a minimum number of parts, easy to assemble, install and repair, and one which assures even pressure over the entire area of the disc liners, and one which completely frees the braking elements when the fluid pressure is released.

It is well known that hydraulic pressure has been used for the operation of brakes, though so far as known, none has anticipated the principle set forth in this application, and therefore those so far advanced are more complicated, having a greater number of parts, and not supplying the rigidity essential to maximum efficiency.

This invention uses a single disc between two pressure plates, with the discs rotatable with the wheel, one pressure plate fixed and the other only axially movable, and using a continuous annular cylinder and piston for axially moving the movable disc.

The objects and advantages of the invention are as follows:

First, to provide a disc type vehicle brake in which the disc and wheel drum alone are rotatable and in which hydraulic pressure is utilized for gripping the disc.

Second, to provide a brake as outlined in which the brake is actuated through an annular cylinder and piston through fluid under pressure.

Third, to provide a brake as outlined which is of the utmost simplicity in construction and arrangement and having a minimum number of parts.

Fourth, to provide a brake as outlined which is easy to assemble and disassemble, to replace and repair, and which is economical to manufacture.

Fifth, to provide a brake as outlined which provides uniform pressure over the entire area of the disc irrespective of the pressure applied, and which is therefore of the utmost efficiency.

In describing the invention reference will be had to the accompanying drawings, in which:

Fig. 3 is an enlarged fragmentary view taken in the direction 3—3 on Fig. 2.

Fig. 4 is an enlarged fragmentary sectional view taken on line 4—4 of Fig. 3.

Fig. 5 is an enlarged section taken on line 5—5 of Fig. 2.

Fig. 6 is an enlarged fragmentary sectional view taken on line 6—6 of Fig. 2.

Figure 1:
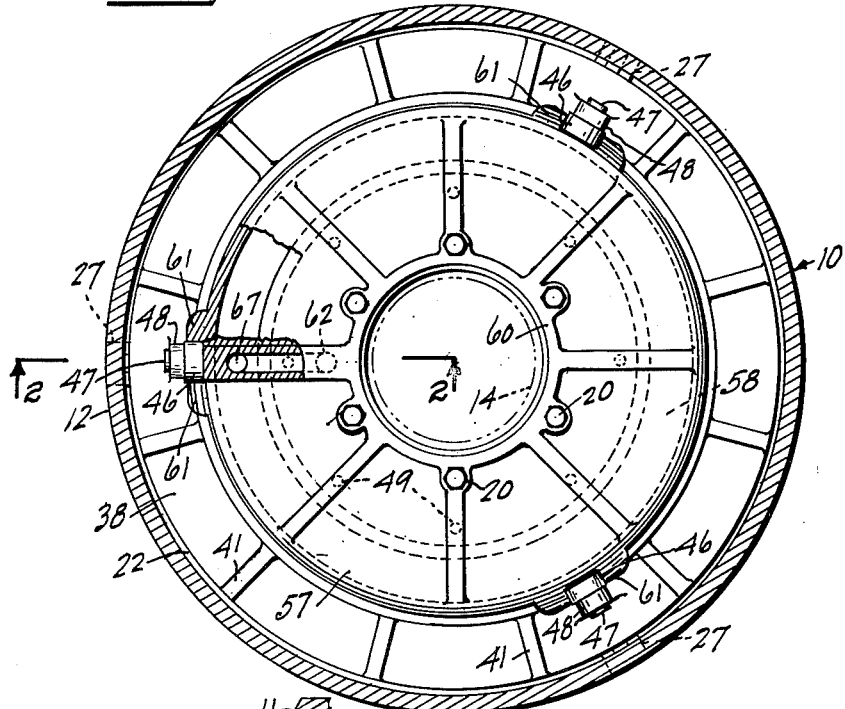
Fig. 1 is a front elevation of the invention showing a portion in section.
Figure 2:
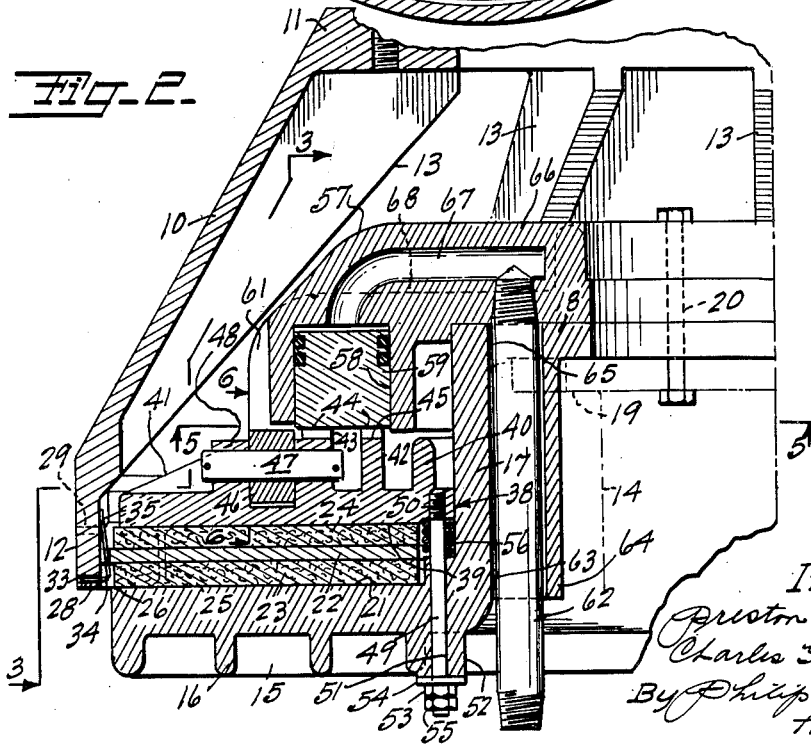
Fig. 2 is an enlarged section taken on line 2—2 of Fig. 1.

The invention includes a wheel drum 10 the head 11 of which is attachable to the wheel of the vehicle, the terminal open end 12 being cylindrical in form, and the drum being internally reinforced by ribs 13 as indicated to provide ample rigidity and strength.

Fixedly mounted on the axle 14 is a backing plate 15 which is ribbed on its outer face as indicated at 16 for dissipation of heat; this plate having a hub 17 which terminates at its inner end in an inturned flange 18 by which it is secured to the flange 19 on the axle as indicated at 20; thus this pressure plate is rigidly fixed on the axle; the inner surface 21 of this disc being smooth finished and plane for cooperation with the friction facing.

The disc consists of a metal plate 22 to each face of which a friction facing, respectively 23 and 24 is fixed as indicated at 25; the periphery of the facing terminating within the periphery of the pressure plate as indicated at 26, while the metal body disc 22 extends outwardly to the outer periphery of the drum.

The open end of the drum has equally spaced projections 27 about each of which a channel-shaped reinforcing member 28 is fixed with the ends 29 of the legs set into the body metal as shown for firm anchorage and to prevent any spreading of the legs; and the body disc has an equal number of recesses 30 with the side walls faced with reinforcing blocks 31; being preferably welded as indicated at 32 and with the blocks slidably spanning the channel-shaped reinforcing member 28 as illustrated in Fig. 3, and thus compensating for any slight eccentricity of the disc. A groove 33 is formed in the edge of the projection 27, and a leaf spring formed substantially to a right angle has its free end 34 slidable in this groove with the other terminal end 35 fixed to the drum as indicated at 36, with the spring urging against the bottom wall 37 of the recess 30 to retain the disc against rattling or chattering and provide a quiet operating brake.

The thrust plate 38 is finished plane on one surface 39 for cooperation with the friction lining and on its other or back surface is provided with cooling ribs 40 and 41, plus the combined thrust and cooling annular ribs 42 and 43 the top surfaces 44 of which are finished parallel throughout certain equally spaced areas with the intervening portions recessed as indicated at 45 for circulation of air.

Equally spaced rollers 46 are mounted on radial shafts 47 the respective ends of which are supported in bearings 48 and in bores formed in the rib 43 as shown, the ribs 40, 42 and 43 being annular. Adjusting means and retracting means for this thrust plate consists of a plurality of equally spaced studs 49 which are threadedly fixed in the inner portion of the thrust plate as indicated at 50 and slidable through a bore 51 formed through the backing plate and a boss 52 integral therewith, this boss having a finished surface. A nut 53 having a collar 54 is used for adjusting the clearance of the thrust plate, with a locknut 55 or other suitable means being provided for locking the collar nut in adjusted position, and a compression spring 56 is seated between the underside of the thrust plate and the top side of the backing plate as shown.

The pressure head 57 has an annular cylinder 58 formed therein, and an annular piston 59 operates in this cylinder and cooperates with the top surfaces 44 of the ribs 42 and 43, and this pressure head has a flange extension inwardly as indicated at 60 and is secured to the flange 18 on the backing plate and simultaneously to the flange 19 on the axle by the securing means 20, making the backing plate, pressure head and axle a fixed unit.

Guides 61 are formed integral with the pressure head and project downwardly to span the rollers as is clearly illustrated in Fig. 6, these guides being formed exteriorly of the cylinder. A pressure fluid inlet 62 shown as a section of pipe passes through a clearance hole 63 in a boss 64 formed on the backing plate internally of the hub 17, and through a similar clearance hole 65 formed through the flange 18 and being threadedly secured in the header 66 and opening into the passage 67 to the cylinder; the method of connection eliminating the necessity for packing between the flange 18 and the header, and the boss 64 protecting the connection against vibration or damage from other causes and assuring long life for the connection.

Assembly of the brake is quite simple. The disc is placed on the backing plate, the thrust plate is placed on the disc, the thrust plate having the studs 49 and springs 56 in position. The pressure plate is next placed on the thrust plate with the guides spanning the rollers, this pressure plate already having the connection tightly screwed in position. Bolts 20 are then passed through the assembly and through the flange 19 on the axle, and tightened, and the supply of fluid is connected to the connection 62 and fluid under pressure is delivered to the cylinder and maintained while the collar nuts 53 are placed on the studs 49 and screwed up with a feeler of predetermined thickness according to the clearance desired, placed between the face of the boss and the underside of the collar, after which the locknut is drawn up to lock the adjustment. The fluid is relieved, and the wheel mounted on the end 11 of the drum, making the brake ready for operation.

As the liners wear, the collar nuts can be taken up further, using the same feeler for spacing. As will be noted, the springs 56 relieve the grip between the friction surfaces, forcing the thrust plate away from the disc, assuring frictionless operation when no fluid pressure is applied.

The drum 10 and disc rotate with the wheel, while all other parts are held against rotation, with the pressure head and backing plate neither rotatable or axially movable relative to the axle and with the thrust plate only axially movable.

We claim:

1. A brake comprising, a drum attachable at one end to a wheel of a vehicle, a backing plate and a pressure head fixed together and to the axle of the vehicle, a friction disc and a thrust plate interposed between said backing plate and said pressure head, keying means cooperating between the other end of said drum and said disc, and keying means cooperative between said pressure head and said thrust plate for axial movement of the disc and thrust plate relative to the drum and backing plate-pressure head assembly, said pressure head including an annular cylinder and a piston therefor cooperative with said thrust plate, and a fluid connection for said cylinder; said thrust plate having a plurality of equiangularly spaced rollers mounted on radial axes, and said pressure head having guide members straddling said rollers and functioning as said keying means cooperative between said pressure head and said thrust plate, to maintain said thrust plate against relative rotation while permitting axial movement thereof.

2. A disc type brake comprising a plurality of cooperative members including thrust members and an interposed friction disc and means for rotatably driving said disc, and including an annular cylinder and an annular piston therefor cooperative with one of said thrust members for urging said disc against the other of said thrust members, and a fluid connection for said cylinder; said thrust members comprising a backing plate having an axial hub terminating in an inturned flange, and a thrust plate slidable on said hub; said cylinder having an inwardly projecting flange, with said flanges securable together and to a flange on a vehicle axle, and said thrust plate having annular seats for cooperation with said annular piston for uniform pressure throughout the area of the friction disc.

3. A disc type brake comprising a plurality of cooperative members including thrust members and an interposed friction disc and means for rotatably driving said disc, and including an annular cylinder and an annular piston therefor cooperative with one of said thrust members for urging said disc against the other of said thrust members, and a fluid connection for said cylinder; said thrust members comprising a backing plate having an axial hub terminating in an inturned flange, and a thrust plate slidable on said hub; said cylinder having an inwardly projecting flange, with said flanges securable together and to a flange on a vehicle axle, and said thrust plate having annular seats for cooperation with said annular piston for uniform pressure throughout the area of the friction disc; said means for rotatably driving said disc comprising a drum having one end attachable to a vehicle wheel and including cooperative keying means between the disc and the other end of the drum and relatively axially slidable.

4. A brake comprising; a drum having one end attachable to the wheel of a vehicle and a friction disc keyed for sliding movement in the other end and rotatably driven thereby; a backing plate on one side of said disc and having an axial hub terminating in an inwardly projecting flange; said disc having an axial bore clearing said hub; a thrust plate on the other side of said disc and rotatable on said hub and having an annular seat and having a plurality of rollers mounted on radial axes and equi-angularly spaced; a pressure head having an inwardly projecting flange for securing to the flange on said hub and having an annular cylinder having an annular piston seated on said annular seat, and a fluid connection for said cylinder and guide members formed peripherally on said pressure head and straddling said rollers and functioning as keying means to retain said thrust plate against rotation relative to said pressure head, and means for securing said flanges together and to the axle of a vehicle.

PRESTON W. HOVEY.
CHARLES G. KING.

REFERENCES CITED

The following references are of record in the file of this patent:

UNITED STATES PATENTS

| Number | Name | Date |
|---|---|---|
| 2,014,630 | O'Brien | Sept. 17, 1935 |
| 2,094,065 | Frank | Sept. 28, 1937 |
| 2,384,297 | Goepfrich | Sept. 4, 1945 |
| 2,417,854 | Barish | Mar. 25, 1947 |